United States Patent [19]

Brosow et al.

[11] 4,114,032
[45] Sep. 12, 1978

[54] DOCUMENTS HAVING FIBERS WHICH ARE COATED WITH A MAGNETIC OR MAGNETIZABLE MATERIAL EMBEDDED THEREIN AND AN APPARATUS FOR CHECKING THE AUTHENTICITY OF THE DOCUMENTS

[75] Inventors: Jörgen Brosow, Elsenwang-Hof, Austria; Erik Furugard, Geneva, Switzerland

[73] Assignee: Dasy Inter S.A., Geneva, Switzerland

[21] Appl. No.: 647,935

[22] Filed: Jan. 9, 1976

Related U.S. Application Data

[62] Division of Ser. No. 469,625, May 13, 1974, abandoned.

[30] Foreign Application Priority Data

May 11, 1973 [DE] Fed. Rep. of Germany ....... 2323897
Jun. 6, 1973 [DE] Fed. Rep. of Germany ....... 2328880
Apr. 10, 1974 [DE] Fed. Rep. of Germany ....... 2417564

[51] Int. Cl.$^2$ .................. G06K 19/06; G06F 7/02; G06K 7/00
[52] U.S. Cl. .................. 235/493; 235/431; 235/440
[58] Field of Search ............... 235/61.11 D, 61.12 M; 340/146.3 K; 360/81, 88, 2

[56] References Cited

U.S. PATENT DOCUMENTS

| | | | |
|---|---|---|---|
| 3,419,710 | 12/1968 | Mathews, Jr. et al. | 235/61.11 D |
| 3,581,064 | 5/1971 | Palmer | 235/61.11 D |
| 3,612,834 | 10/1971 | Arikawa et al. | 235/61.11 D |
| 3,634,656 | 1/1972 | Krechmer et al. | 235/61.11 D |
| 3,636,318 | 1/1972 | Lindstrom et al. | 235/61.12 M |
| 3,768,094 | 10/1973 | Henrich | 235/61.11 D |

*Primary Examiner*—Vincent P. Canney
*Attorney, Agent, or Firm*—Holman & Stern

[57] ABSTRACT

A method of manufacturing documents such as paper money, credit cards, identification cards and the like in a manner so as to prevent forgeries thereof, comprises the steps of producing a base material, coating fibers with a magnetic or magnetizable material, and embedding the fibers into the base material during the production of the base material; an apparatus for checking the authenticity of documents such as paper money, credit cards, identification cards, and the like comprises in combination a document having fibers which are coated with a magnetic or magnetizable material embedded therein, detecting means for scanning the document to determine the number of magnetic particles present in the document, and means for moving the document and the detecting means relative to each other so as to provide a scanning trace, the document and the detecting means being disposed in a close relationship to each other.

4 Claims, 8 Drawing Figures

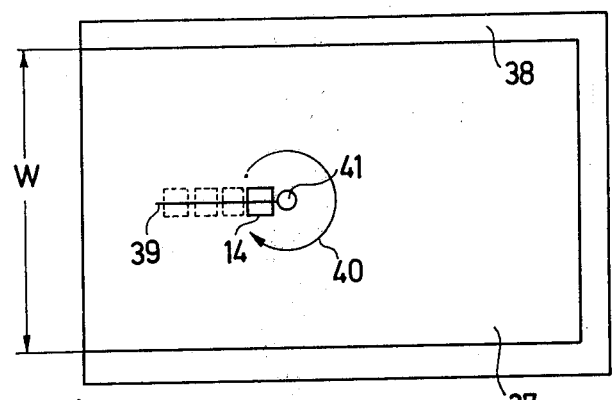
Fig. 4
Fig. 5
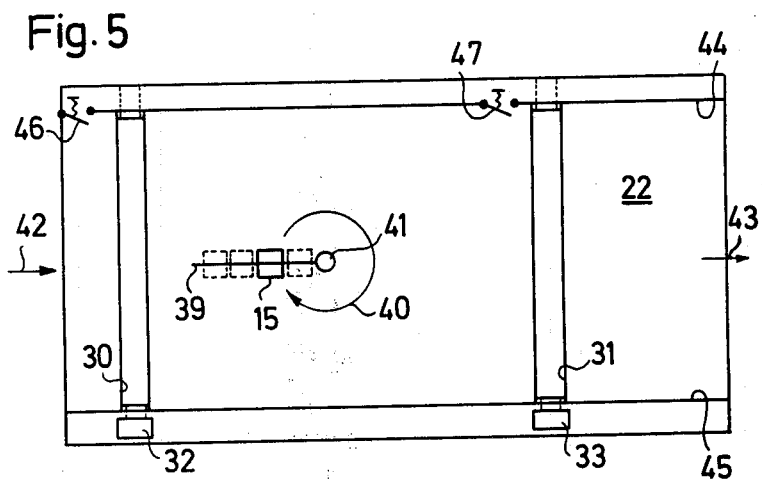
Fig. 6
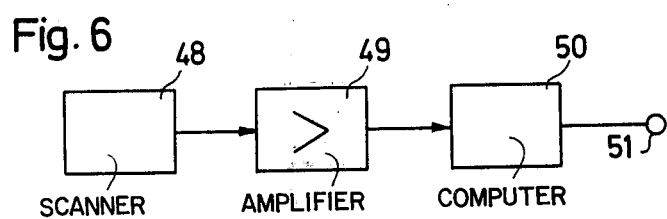

4,114,032

DOCUMENTS HAVING FIBERS WHICH ARE COATED WITH A MAGNETIC OR MAGNETIZABLE MATERIAL EMBEDDED THEREIN AND AN APPARATUS FOR CHECKING THE AUTHENTICITY OF THE DOCUMENTS

This ia a divisional of application Ser. No. 469,625 filed May 13, 1974, now abandoned.

BACKGROUND OF THE INVENTION

This invention relates generally to forgery-prevention and more particularly, it relates to a method of manufacturing documents, such as paper money, credit cards, identification cards, and the like, having fibers embedded therein to increase the safeguarding factor against forgery, and an apparatus for checking the authenticity of the documents. The fibers (or filaments) are coated with a magnetic, or magnetizable material, and the filaments are checked with respect to the correct type and density of their filiform particles.

PRIOR ART

It is generally known that valuable documents have always been safeguarded against forgery and misuse. Heretofore, this was achieved by the utilization of special qualities of paper with water markings and through the use of the highest-possible forgery-proof printing. However, the proof of the authenticity of a document was extremely difficult in these cases. Furthermore, especially in automatic machines, there was a substantial reduction of the obtainable forgery-safeguard when utilizing an authenticity check. In the general counter-business transactions where the customers' transactions are with money automats or automatic machines for other purposes, there arose a need to provide a material for such types of documents which would provide a check on authenticity by simple means in the automat, but which would not reduce the safeguarding factor against forgery or misuse.

There is known in the art a magnetic paper which gives the paper completely changed characteristics by means of metal particles embedded in the paper for the protection of valuable documents against forgery, with the characteristics being evaluated for determining the authenticity of the document. (As evidenced by German Pat. No. 822,464.) However, in the prior art magnetic paper, the metal particles did not adhere adequately with the fiber material from which the paper was produced. Further, there was a tendency for the metal particles to become separated from the paper during usage. Also, the metal particles were forced out of the paper during rubbing and wrinkling, as paper money is subjected to quite frequently. Thus, such paper loses its magnetic characteristics, at least partially, and thus renders the checking for authenticity quite difficult. Additionally, the paper is physically destroyed. The prior art magnetic paper, therefore, has not been acceptable in practice.

In addition, the metal particles cannot merely be replaced by metallic fibers which would be less difficult to utilize in the manufacturing of the paper and which would be somewhat better to be embedded into the paper. The reason for this is that metallic fibers of the required strength of, for example, 1 to 10 micrometer, can only be manufactured at extremely high costs. Accordingly, such an increased price of the material for documents is not acceptable in order to obtain the additional possibility for establishing its authenticity.

A less expensive and simpler form of obtaining a magnetized paper exists in that a metallic dust could be applied to the surface of the paper in a layer of a binding agent, such as glue. However, such layers are also not without disadvantages in that they cannot withstand the wear to which paper bills are subjected to in the ordinary daily business transactions. If the coating is worn thereby, then a genuine document would be classified as a forgery during an examination for its authenticity. Indeed, such a misclassification must thus be avoided at all cost.

There are well-known magnetic materials such as the elements of iron, cobalt, and nickel. Nickel is especially suitable due to its characteristics of oxidation-stability and strong magnetizability. Furthermore, there are available numerous alloys and also non-metallic materials having similar magnetic characteristics.

In addition to these materials having magnetic characteristics, it is also well-known in the art that there exist materials which are magnetizable. Such materials, i.e., iron-oxide or chromium-dioxide, are extensively utilized in record or track supports. Such magnetizable materials are also utilized in the checking of documents against forgery. Thus, it is possible to enter additional coded information on customer's I. D. cards wherein the information must correspond with that information which is entered by the owner of the card via a keyboard, i.e., the upper limit of the amount to be paid on the basis of the presented customer's I. D. Card.

SUMMARY OF THE INVENTION

It is therefore a general object of the present invention to eliminate the above-mentioned disadvantages in the prior art magnetic paper for preventing forgery of documents through a simplified and improved means.

Accordingly, an object of the invention is to provide for a magnetic material for documents which is inexpensive to manufacture and which will provide additional possibilities for checking the authenticity of documents.

To this end, the present invention is concerned with the provision of a material for documents wherein fibers, which are coated with a magnetic or magnetizable material, are embedded in a binding agent. The fibers having a low density desired in the order of size of a few micrometers, which, depending upon the requirement, can be clearly either below or above, can be manufactured easily and economically. Thus, carbon fibers of random strength can be obtained immediately from crude oil. The coating of the fibers with magnetic or magnetizable material is also easily made possible.

Further, the fibers having a magnetizable metal can be galvanized. During the non-electric galvanization, the magnetic material is deposited thus on the surface area of the fibers. During the electric galvanization of the fibers, the deposition of the magnetic metal onto the surface of the fibers is accomplished with the aid of electric power. Due to the electric conductivity of the carbon fibers, these fibers themselves can be especially suitable therefor since they can serve as electrodes for the electric galvanization. In this latter type of galvanization, it is also preferable to use nickel to penetrate into the carbon fiber due to its porous nature. The fibers thus obtained compare substantially to the nickel fibers or identical dimensions in regard to their magnetic characteristics. On the basis of the simple manner in which the carbon fibers are manufactured and galvanized, the price for such magnetic fibers and the size of its order are reduced below the price for which the magnetic metal immediately produced fibers can be manufactured. During the galvanization, there can be obtained desired fibers in which the fiber material remains free of magnetic metals in certain spots.

The application of magnetizable material can also be made in a galvanized process. Additionally, it is favorable to have the filament fibers in this connection made electrically conductive such as the given example of the carbon filament. In this case, the magnetizable material can be guided to the surface of the filament by means of a power transport wherein the formed coating can be precisely controlled by the requirements set in the galvanization; for example, the composition of the bath, the strength power and power density can be controlled precisely. On the other hand, it should be noted that chromium-nickel-dioxide, for example, cannot be applied galvanized. In this case, work will be done with chromium-nickel-alloys themselves and other methods will be utilized for the first-mentioned material.

It is also thus possible to apply the magnetic or magnetizable material to the fibers by means of steaming. Various techniques for steaming material onto parts of small surfaces are quite well-known in the art, and these techniques can be utilized herein. In lieu of steaming, it is also possible to spray the material onto the filament. In this method, the material is applied, for example, to a base material or to a binding agent and is then sprayed on together with the binding agent. It is further possible to apply the material to the filament by means of an immersion method, wherein the material is also mixed with a base material, preferably a binding agent. Due to the type and temperature of the immersion bath and the manner of guiding the filament through the immersion bath, it is, therefore, possible to control accurately the strength and structure of the coating.

The magnetic or magnetizable material may, however, be also applied to the filament by means of over-printing. The term "over-printing" is defined and understood as any manner of a mechanical transmission of the magnetic or magnetizable material onto the filament. At times, it may also be expedient to coat a filament only partially with magnetic or magnetizable material. This will make forgery thereof somewhat more difficult. The partial coating can also be utilized as a form of coding or marking.

If short filaments are used, which are determined for embedding into the paper, then in such a case a magnetic fiber head or a fiber end which is coated with a magnetic material, may be proposed. It may be quite difficult, but it is often necessary for reasons of safety in the manufacture of paper monies, credit cards, etc., to give the filaments a direction which is vertical or perpendicular to the plane of the paper. This was obtainable in the prior art only with great difficulties. It is now sufficiently simple to have one magnetic field which is effective below the paper train during the manufacture of the paper in order to place the filaments which are provided with a magnetic material into the vertical position. A tearing or splitting of a money bill thus produced is hardly possible.

The coated filaments, i.e., galvanized carbon fibers of the above-described type, are very suitable in the manufacture of the paper. They can be very easily embedded into the paper material and merge closely with the same, and especially in the case where the filaments remain ungalvanized in spots. However, the ungalvanized filaments remain, under all circumstances, in the paper to which they are applied, and also in the case when such paper is subjected to frequent rubbing and wrinkling.

During the production of the documents, it is important to give a specific weight factor to the fibers by means of the coating which is equal to the weight of the fibers in the manufacturing process. Carbon filaments, for example, have a specific weight far below 1 g/cm$^3$ due to their porous nature. The coating should therefore increase its weight. If the fibers which are to be embedded and the wood fibers which are utilized in the paper manufacturing have approximately the identical weight (per unit of measure), then these fibers will also show identical characteristics during the processing of the paper pulp so that segretation processes cannot develop and the material having an even quality can be obtained with common devices,. Thus, it can now be seen the importance of this feature.

Thus, it should be evidence that there is provided a type of magnetic document material through a simple and economical method with magnetic characteristics which are extremely simple to check by an automatic device. The simplest type of checking for the authenticity, for example, is perhaps to mount a magnetic plate into a counter top or a store table. The paper money is then proved to be genuine if the bill sticks to the magnetic plate. It can be basically established with simple instruments if the document to be present has magnetic characteristics which indicates it is genuine.

The authenticity test can also be made more sophisticated with similarly simple means if not only the presence of the magnetic characteristics of the document material in general, but also the intensity of the effect of the magnetic flow through the material is considered. The effect of the magnetic flow depends upon the respective density of distribution of the magnetic particles in the document material. This density can be selectively controlled, i.e., the filaments are embedded into the material in various densities. If variable strong galvanized carbon filaments are utilized, then it is possible, for example, to make differences between one bill of a value of 100 units and a bill of a value of 10 units in otherwise equal paper qualities.

Of course, it is also possible to improve the authenticity test by providing further only partical sections of the document, i.e., the material to be utilized for its manufacture, with magnetic characteristics. It is thus possible to provide only one strip of the base material with embedded elements. Also, a plurality of strips may be used which are separated either by strips having no magnetic properties or which exhibit a different effect of the magnetic flow. A further possibility of control is accomplished when the intensity of the effect of magnetic flow is changed along a strip which, for example, is scanned for its authenticity in an automatic device by a scanner.

The above-mentioned differences may serve as a code to distinguish checks, which are to be cashed, at certain varying points, or only up to a certain limiting amount. Furthermore, varying documents may be distinguished from a series of similar documents, such as paper money.

Dependent upon the type of base materials used, it may be possible to recognize the embedded filaments from the outside so that the arrangement may be easily copied. This disadvantage of a visual recognition of the strip arrangement of magnetic filaments can be eliminated by inserting coated filaments into the non-magnetic strip of the material which are between the strips having magnetic characteristics, wherein these non-magnetic strips are not coated with a magnetic metal, but with a non-magnetic metal, such as aluminum or zinc. Consequently, there does not exist a visually recognizable difference since the entire surface of the document has its composition or quality evenly distributed. Nevertheless, the material which comprises non-magnetic as well as magnetic strips or tapes can be easily detected during the testing for authenticity.

Another object of the invention is to provide simple devices which are suitable for testing the above-described material with regard to its authenticity.

To this end, the present invention is concerned with the provision of a device which enables an authenticity control of documents having magnetic or non-magnetic particles comprising the document and a scanner being moved in close relationship to each other, and means for moving the document and the scanner relative to each other so as to provide a scanning trace, the scanner determining the number of particles which are positioned in the scanning trace. In this manner, an authenticity control is made simple since it is possible to obtain a relative movement of the scanner and the document with a mechanically simple instrument, wherein a scanning trace is obtained and the number of magnetic or non-magnetic particles can be established. This number must then correspond with a pre-established value. In this manner, an authenticity control is effectively made with a small expenditure of technical equipment. For example, a credit card for the current calendar year can be distinguished from one which has been manufactured of a material which has been used in the previous calendar year when the amount of magnetic filaments for the material used in the manufacture of the cards is changed from year to year. Furthermore, an additional possibility for checking the authenticity of paper money can be made available for money-changing automats when one bill with a certain denomination is provided with a pre-determined filament-load. This type of authenticity control may be combined with a plurality of other known possibilities for the authenticity control so that an increased safety factor, especially with regard to forgery, is obtained.

There are numerous varying devices which are possible for producing the relative movement of the document and the scanner. The simplest possibility would exist when the scanner is moved over a pre-determined path, i.e., forwards and backwards over the document. In order to realize precise results, it is, however, recommended that a precise and well-reproducible position of the scanning trace be provided. Then, it is also possible to provide an additional safety factor in that only a pre-determined part in a document which is unevenly loaded with magnetic particles, which is not recognizable from the outside of the instrument, is scanned. In order to provide a rectilinear scanning trace, it is thus advantageous to arrange the scanner in a fixed manner in the device and to provide the document with a translational movement. In order to obtain a circular scanning trace, it is expedient to retain the document in a stationary position in the device and to provide the scanner with a rotational movement.

However, the rectilinear or circular scanning trace still represents a relatively simple geometric form which is subject to forgery. It is, therefore, recommended by means of special relative movement between the document and the scanner to provide scanning traces of more complicated forms which, especially in an uneven distribution of the magnetic particles, make forgery more difficult. Thus, a scanning trace can be obtained in the form of a two-dimensional helix when the scanner is given a rotational movement and the document is simultaneously given a translational movement. In order to provide a true helical form, the linear speed of the rotational movement thereby must be greater than the speed of the translational movement. In the event that this requirement is not met, a curved scanning trace is obtained which still provides for a substantial safeguard against forgery. Another complicated and thus very effective form of a scanning trace can be seen in the spiral. Such a spiral trace is obtained when the scanner is subjected to a rotational movement and this rotational movement is overlapped by an increasingly enlarged translational movement over the distance of the scanner from the rotational center. In lieu of a uniform translational movement of the document, a movement with changeable speed is also possible. The utilization of an increase in speed is especially advantageous, for example, with the aid of a stepping mechanism or a stepping motor, since then, during the scanning, changes of the fiber densities can be programmed to be coupled with a pre-determined stepping sequence. All of these movements can be obtained by means of simple gears or mechanical controls.

Magnetic heads may be provided for the purpose of scanning the magnetic filaments which are embedded in the document. Hall-scanners are also suitable for this purpose since they are sensitive to various weak magnetic fields so that in many instances a remanent magnetism of small magnetizable particles suffice completely to be detected by or reacted to by the scanner. In many cases, it is possible to provide for an additional safety factor if each single (detector) scanner scans a measuring area of identical size, i.e., its measuring results is computed out to the area size unit.

In order to obtain precise measuring results during the scanning function by the scanner, it is expedient to provide an additional magnetization before the scanning of the filaments which are coated with a magnetizable material in a tracing-base fashion, and embedded into the document material. For accomplishing this result, it may be necessary to guide the document past a magnet during its insertion into the device. If the document is given a translational movement during the scanning, such a movement is made by means of a drive-spindle which cofunctions with a back-up roller. In this case, magnetization can be obtained in that the drive-spindle is constructed as a magnet. If the drive-spindle is constructed as a rubber-coated ferrite core, especially simple and functional effective results are thus obtained. It is thus also possible to construct the drive-spindle as only a partial magnet, for example, only for one half or a certain part of its length, or only for a section of its cross-cut (for one half of its cut). In this way, there will result in that only one pre-determined part of the magnetizable particles, which are embedded in the document, are always being magnetized. Thus, this will make forgery more complicated and difficult.

It is also possible to scan always only one predetermined local area and to provide only one section of this area with magnetic or magnetizable particles in the document. A forgery of the type wherein magnetic or magnetizable materials are applied on the outside onto a forged document is made very difficult in this case. However, it is necessary to provide means in the authenticity control so that the scanning of the document by way of the scanner is made in a precise local arrangement. This may be accomplished by means of stops or guiding elements. If the scanning of a well-defined local area is not necessary, then a scanner may be utilized in place of a fixed instrument having stops and guiding devices for the elements, which can be freely placed onto the instrument and in which the scanner itself is moving.

A further protection against forgery is made possible when the start signal of the scanner, according to amplitudes, is sorted in such a manner so that for the counting or as a start signal of the computer, only such pulses are permitted to pass through which are provided with amplitudes which are between a lower and an upper limit value. Since the scanner responds to magnetic fields which, in themselves depend again on the type of magnetic particles, the type of magnetization and the arrangement in the document, a forgery is virtually impossible in the limitation of the value of the path of a pre-determined amplitude. It can be established with great identification-safety that the evaluation of the pulses produced and amplified by the scanner through the utilization of a pulse-shaper.

A still further possibility of testing the authenticity consists in the utilization of a scale in which the weight of a document under the affect of a magnetic field is weighed. It is especially advantageous to determine the weight of a document in two weighing operations; namely, under the effect of a magnetic field and without the effect of a magnetic field and to expand the differences of the two weighing results. Deviations in the weight which are the result of the level of humidity, wear, etc., are thereby noted and the value of the established differences is typical for each of the individual documents.

Finally, the result of the authenticity control is produced expediently by an instrument in numerical form or as a symbol.

BRIEF DESCRIPTION OF THE DRAWINGS

These objects and advantages of the present invention will become more apparent from the following detailed description when read in conjunction with the accompanying drawings in which:

FIG. 4 shows a device having a rotating scanner which is provided with steps which fixedly hold a document;

FIG. 5 shows a device similar to the top view shown in FIG. 4 with a translational movement of the document, and a rotating, possible overlapped rotating, and displaced scanner;

FIG. 6 depicts a block diagram illustrating the basic principle for the evaluation of the authenticity control;

DETAILED DESCRIPTION OF THE PREFERRED EMBODIMENTS

Figure 1:
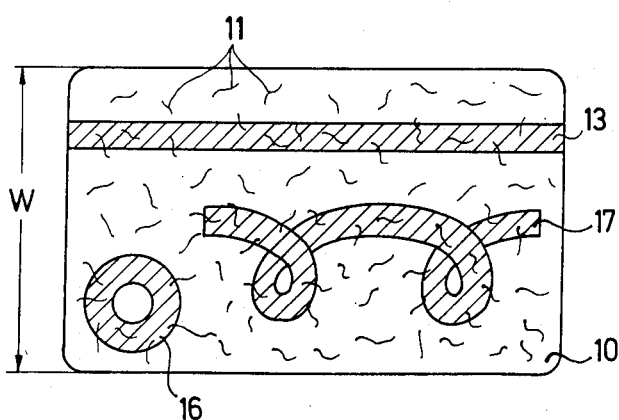
FIG. 1 is a top plan view of a credit card or the like with possible forms of scanning traces.

Referring to FIG. 1, reference numeral 10 designates a document which represents a credit card or the like. The document 10 consists of a material which contains easily distributed filiform particles 11 which are magnetic or magnetizable. It is, therefore, preferable to use such fibers which can be easily processed in the production of documents, namely, which correspond closely with the fibers in the manufacture of paper in size and specific weight, or which suffice the requirements of synthetic material production. For example, these may be cotton filaments or carbon filaments, which are coated additionally with a magnetic or a magnetizable material. Of course, it is also possible to produce only one surface layer of a material with the particles 11 during the laminated sandwich-fashion constructions of the documents 10. Into another surface layer, there may be included, for example, also magnetic tapes, etc., for producing a magnetic trace. It will therefore be necessary to separate the surface layers from each other by means of a magnetic protective shielding material. An interim layer of a $\mu$-metal is especially suitable for this purpose. Furthermore, it is possible to load only a pre-determined section of the document 10 with a magnetic or magnetizable particle 11 and to arrange such sections in a local or interchangeable manner. A more fuller explanation of this will be described in detail hereinbelow.

In FIG. 1, there are indicated by broken lines various possibilities of the scanner traces on the document 10. Such scanner traces may be produced by means of a relative movement of a scanner which responds to the magnetic or magnetizable particles 11, and the document 10. Thus, there develops a rectilinear scanner trace 13 in the case where a scanner 12 (FIG. 2) is stationarily arranged and where the document 10 is given a translational movement. Of course, a rectilinear scanner trace 13 is also obtained in the case where the document 10 is stationary retained and the scanner 12 is guided along a straight line over the document. This possibility may seem still to be a more simple one. In a mechanical-technical sense, a precise arrangement of the area, which is to be scanned by the scanner to the scanner is, however, made easier when the scanner is stationary.

If the stationary scanner 12 is replaced by a scanner 14 (FIG. 4) which rotates on an axis perpendicular to the surface of the document 10 or a scanner 15 (FIG. 5) which is rotatable and radially shiftable with respect to its rotational axis, then a circular, two-dimensional spiral-shaped or circular scanning trace will be obtained. It is also possible to rotate the document with a stationarily arranged magnetic head. A circular scanning trace 16 results when the document 10 is stationarily retained and the scanner 14 is rotated around an axis at a fixed distance. If the document 10 is provided a translational movement when the scanner 15 is rotating around a stationary rotational axis, then a two-dimensional circular scanning trace 17 will be obtained. In order to obtain the form of the scanning trace 17 as shown in FIG. 1, it is necessary to provide the scanner 15 with a higher absolute speed than the document 10. If the speeds should become identical or if the absolute speed of the document 10 becomes higher than the speed of the scanner 15, then the form of the scanning trace 17 is transformed to a curve which is running together in more or less strongly developed tips. Additionally, it can also be noted from FIG. 1 that one part of the scanning trace 17 may be spiral-shaped, in the case where the rotating scanner 14 (or 15) is provided with a speed (overlapping the rotational movement) which is radially directed to the rotational axis, in addition to the rotational axis. It can be clearly seen that mechanical/-technical requirements must be therefore observed so that the scanning traces 13, 16 or 17 are positioned on a well-defined area of the document 10. This is especially important in the case where a magnetic or magnetizable particle 11 is present in an irregular configuration, or with interruptions in a layer of the document 10.

The scanner is constructed in a manner so that it reacts to the magnetic particles 11 which it traces in this area so that an evaluation of the density of these particles can be obtained with a Geiger counter by means of a pulse count. Such a simple counting process, which additionally can be made simultaneously with other evaluations during the use or control of the document 10, can thus provide with safety the establishing of the authenticity of the document 10 consisting of the prescribed material or that this document actually shows a pre-determined density of the particles 11. This will produce a further increase in the safeguarding factor against forgery.

For manufacturing-technical reasons, it is difficult to forge such a type of material which is provided with magnetic or magnetizable particles. The scanner, however, would under all circumstances respond also to such magnetic particles which are applied to the surface of a document consisting of the wrong material. If this is done with sufficient precision, it could then happen that the device would accept also such a forged document as being authentic. This can be prevented in two ways.

For one, it is possible to provide only well-defined parts of the document 10 with the particles 11 and to place the scanning trace of the scanner in such a fashion so that parts are scanned which are either provided with particles or which are not provided with the particles. A forgery is then very difficult since the document 10 does not have continuously equal magnetic characteristics.

A further possibility exists in that the starting signal of the scanner is examined with regard to its amplitude since it is very difficult to apply particles in forgeries, which have the identical magnetic affect on the scanner as the regular utilized magnetic particles. A magnetic field which is either too weak or too strong, however, produces on the scanner pulse amplitudes which deviate from the normal value. If an amplitude detector is series-switched to the scanner, which will sub-divide the incoming pulses into pulse-groups of various amplitude areas (level quantizer) and will allow only for one amplitude area to pass, forgeries will then also be made very difficult.

Figure 2:
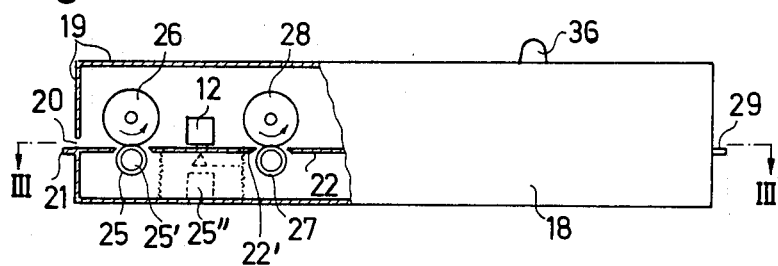
FIG. 2 is a partial sectionalized view taken along the line II—II of FIG. 3 of an instrument with a stationary scanner and a translational movement of the document.
Figure 3:
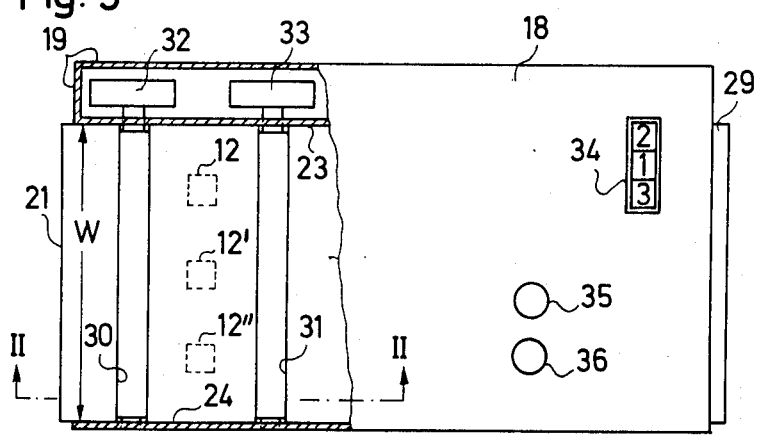
FIG. 3 depicts a partially top plan view and a partially sectionalized view taken along the line III—III of FIG. 2 of an instrument with a stationary scanner and a translational movement of the document.

FIGS. 2 and 3 show a technical embodiment of a device with which a rectilinear scanning path 13 can be obtained. This device comprises a box with a housing 18, which is manufactured either of metal sections 19 or of a synthetic or similar material. A document 10 of a width W is guided into the inside of housing 18 by means of an inlet port 20, which is simplified by means of an inlet lip 21. The device is provided with a platform 22 as a means of continuation of the inlet lip 21 for the document which is guided through the inlet port 20. The document 10 is carried on the platform 22 and is guided laterally through walls 23 and 24 (FIG. 3) in which the walls serve a guiding element in the device and are placed apart from each other at a distance which corresponds with the width W of the document 10.

During the inserting of the document 10 into the inlet port 20, the document is gripped between a driving spindle 25 and a back-up roller 26, which rotate in the direction as indicated by the arrow. The line of communication of drive-spindle 25 and back-up roller 26 is parallel to the inlet port 20. In the direction of passage which is forced upon the document 10 by the driving spindle 25, the scanner 12 is closely mounted behind the driving spindle 25 above the platform 22 but with a clearance which permits the document 10 to pass therethrough. In lieu of a scanner 12 which scans the document 10 in its scanning path 13, there may be arranged a plurality of such scanners. For example, there are indicated in FIG. 3 by a broken line additional scanners 12' and 12". In the direction in which the document moves and behind the scanner 12, there is arranged an additional drive-spindle 27 and a back-up roller 28, which rotates also in the direction indicated by an arrow. It is in this way that the document 10 is safely guided below the scanner in its entirety until it can finally be removed from the device at an outlet port 29 thereof.

In order to obtain an even magnetization of the particles 11 in the document 10, it is suitable to arrange a magnet near the inlet port 20 and to magnetize with the magnet the particles 11 in an even fashion, for example, up to the full saturation point. This magnetization is obtained especially simple when the driving-spindle 25 is provided with a magnetic core, for example a ferrite core 25'. The structure of the core of the driving-spindle 25 made partially as a magnet and partially consisting of a magnetic material will result in a sectionally changing magnetization when the document 10 is moved through the device. The back-up rollers are not needed in this case since the magnetic forces draw the document 10 onto the ferrite core 25'. The release of the document 10 therefrom is instituted by the stiffness of the document 10 and the edges of the platform 22 which are moved towards the driving-spindle. The driving-spindle 25 and 27 are suitably rubber-coated for increasing the frictional value in view of the document 10 and for the reduction of the document-resistance as shown in FIG. 2. It can also be seen in FIG. 3 that the driving-spindles 25 and 27 are positioned in parts 30 and 31 of the platform 22 and contact herein with the two back-up rollers 26 and 28.

The driving-spindles 25 and 27, like the back-up rollers 26 and 28, are rotatably positioned in the walls 23 and 24. The driving-spindles 25 and 27 are additionally provided with driving units 32 and 33 as schematically illustrated in the drawings, and which, for example, may be an electric motor drive. Of course, it is also possible by means of toothed gearing etc. to connect the gear of the driving-spindles 25 and 27 with each other. Furthermore, it is also possible to construct the device in such a fashion so that the driving-spindles start up only when a credit card or the like is inserted into the device through the inlet port 20.

According to the above-described embodiment of the device, the document 10 is moved forward rectilinearly below the scanner 12 which is stationarily rotated in the device so that the scanner 12 scans the document 10 in a scanning path. The result of this scanning is being evaluated in a manner which will be described in more detail hereinbelow, and is indicated as the number of the total established particles 11, or as the number of the particles 11 in a reference-area or in the area unit in a digital indicator 34. It is however also possible, instead, after completed evaluation of the scanning results, to indicate if the document is authentic or a forgery, or to indicate the acceptance or refusal simply by means of symbols, for example, the flicking of a green lamp 35 or a red lamp 36.

Possibilities for the evaluation of the numeral figure indicated on the digital indicator 34 will be explanted briefly hereinbelow. It is possible, for example, to utilize the number of the particles 11 which are present in a pre-determined scanning trace as a code. The example shown in FIG. 3 represents the indicated sum of count, for example, the numeral "213". This numeral may be utilized as a security key in a manner so that the figure entered over the keys by the user of, for example, a money automat, corresponds with the above-mentioned numeral. For this purpose, it can be operated in a manner so that for a certain document 10, the particles 11 which are present in the selected scanning trace are made known to the customer. Naturally, the system may be improved in that the figure on the document 10 is keyed-in still in another fashion, such as by means of hole-punching, a magnetic tape marking, etc. A still further improvement is obtained when the numbers which are read by the scanner are provided only after a computing function which is programmed into the device or which is provided to it also by the document 10 in codified form, and must correspond with another figure of the document 10. Such highly sophisticated systems are possible also for the simple indication with the aid of the lamps 35 and 36, or other acceptance- or refusal-signals which are processed by the device itself. It is to be especially noted that each device here can operate by itself independent from its place of operation, without the requirement for a connection with a central station. This is of great importance for numerous service-systems which work with customer I. D. cards, etc.

Instead of evaluating all three numbers which are shown on the digital indicator 34, it is also possible, for example, to utilize in this case the single numeral "2" for the evaluation. This is possible especially in the case where different documents have to be identified individually by means of varying saturations of the magnetic particles 11. These may be bills of paper money of various denominations, or credit cards which have a varying maximum limit to be paid or a varying period of validity. For example, a bill of paper money of a single decade or 10-unit value can be valid only when it shows to have 200 to 299 particles, while a bill of paper money in the 1000-unit value must have 800 to 899 particles. Naturally, these values can be accepted also for a reference area and especially for the area unit, instead of for the entire area of the scanning path. It is obvious that the device will thus evaluate each and every document according to the value established by the fibers, and it is independent from the forged money value printed thereon. Also, an immediate optical reading of the overprinted value and a comparison with the value provided by means of the magnetic or magnetizable particles 11 permits a recognition of a forgery and is refused by the device. The same holds true for a document in which the particles 11 are present in an amount which is most unacceptable (in the example given above, this would mean approximately in a number which is indicated by an uneven hundred-unit numeral such as 1, 3, 5, 7, 9).

A further embodiment is possible wherein a part of the otherwise fixed platform 22 is constructed as a scale-platform 22'. The scale-platform 22', for example, as shown in FIG. 2, is retained in alignment with the remainder of the platform 22 by means of springs. A magnetic rod 25" is arranged below the scale-platform parallel to the ferrite core 25' so that the magnetic rod 25" directs one pole towards the scanner 12, with the pole corresponding with the surface of the ferrite core 25'. If a document of a material which is magnetized by the ferrite core 25' moves over the scale platform 22', then there results in a more or less strong force of pull by means of the magnetic rod 25". If this pull is correct, then the scanner is able to perform the scanning as abovementioned. However, if the pull is too strong, then the document 10 will be moved too far away from the scanner 12. A reading is then no longer possible or is else made with an amplitude which is too small. In this manner, only authentic documents are accepted.

Additionally, the adjusting of the scale platform 22' as shown also by the broken line in FIG. 2 can also be transformed by a mechanical-electrical transducer into a signal which corresponds with the result of the evaluation, which enables a further classification into acceptable and non-acceptable documents 10. If the document 10 is too stiff to permit weighing the same, then it is possible to arrange scale-platform 22' and additional accessories at a different location on the device where the document in its entirety can be placed onto the scale platform 22'.

In this case, there is obtained a genuine weight-determination of the document, e.g., a bill of paper money. If the scale is designed in a manner so that at first the weight is measured under the effect of a magnetic field, then the weight is established without the effect of a magnetic field and finally the difference of both measurements are established; it is possible to thus obtain a very favorable additional control which, in addition, is independent of the respective condition of the money bill, such as its humidity or state of wear, and will always provide an end-result which is typical for its value.

FIG. 4 shows a device with which a circular scanning path 16 can be obtained with the aid of a scanner 14. In this case, the document 10 is inserted into a charging box or tray 37 which is provided on at least two, but preferably three sides with fitting edges 38 which enclose the tray 37 in a frame-like fashion. The tray has then, if framed at its three sides by the fitting edges 38 (as shown, for example, in FIG. 4) again the width W of the document 10. In the bottom part of the tray 37, or in a lid which is arranged above the tray 37 and which folds down on the tray, there is arranged the scanner 14 which rotates on an arm 33 around a rotational axis 41, for example, in the direction of arrow 40, so that the rotational axis 41 is perpendicular to the plane defined by the tray 37 or the document 10. This will secure an effective contact of the scanner 14 with the surface area of the document 10 during its entire cycle of movement. Thus, the scanning path 16 of FIG. 1 is obtained.

If the scanner 14 is not retained at a fixed point of arm 39, but is moved from the position shown in FIG. 4 by the drawn line during the rotation constantly away from the rotational axis 41 and thereby away from its rotational center radially outwards, then the embodiment of FIG. 4 does not obtain a circular scanning trace 16 but a scanning trace 17 in the shape of a spiral.

It is also possible to mount on the arm 39 not only one scanner 14 but to mount a plurality of scanners as shown by the broken line in FIG. 4. In the evaluation of the starting signals of the scanners, it must, of course, be considered that they cross over various areas during the passing around the rotational center which is formed by the rotational axis 41. It is possible to give consideration in a computer which analyzes the starting signals of the scanners, or in that the scanners are switched off at various times, namely, those scanners which are located outside the arm 39 are switched off first. If the ON-/OFF times are selected accordingly, this will enable that the scanners are always counting out the numbers of particles 11 in equal areas of the document 10.

FIG. 5 shows an embodiment in which the scanning trace obtains an even more complicated form. In this case, the scanner 15 which is mounted on an arm 39 (or as indicated by the dotted line) also engages a plurality of scanners which rotate in the sense of arrow 40 around a rotational axis 41. It is also obvious that in this case the scanner 15, if required, can be again displaced during the rotational movement along the arm 39. In addition to the movement of the scanner 15, the document 10 can also be given a movement; namely, it performs a translational movement in the sense of arrows 42 and 43. The document 10 is guided in the device as shown schematically in FIG. 5 of the drawings, by means of fitting edges 44 and 45. The driving mechanism for the document 10 for its translational movement on the platform 22 is again made by means of driving spindles 25 or 27, which move in the parts 30 or 31 of the platform 22 and which are provided with schematically indicated gear units 32 and 33. The gear units 32 and 33 are functionally connected with each other. During the inserting of the document into the direction of the arrow 42, a spring-urged micro-switch 46 is closed against the effect of its spring-force, so that the gear units 32 and 33 become functional and the rotational movement of the scanner 15 around the rotational axis 41 is commenced. Along the fitting edge 44, there is located an additional micro-switch 47 in the direction of movement which is indicated by the arrows 42 and 43, at a distance from the micro-switch 46, which should be smaller than the length of the document 10. This micro-switch 47 is located in a further feed-cycle of the various gears. During the passage of the document through the device in contact with the fitting edges 45 and 44, the micro-switch 47 is thus placed in an OFF position against the effect of its spring force, shortly before the micro-switch 46 moves in the ON position. The document 10 is thus further moved through the device until it is moved past the scanner 15 in its entirety and can now be removed from the device in the direction of the arrow 43. The complicated form of the scanning trace renders thereby forgery almost impossible.

FIG. 6 shows in the most simple embodiment the principle of the electrical evaluation of the scanning process. A starting signal of a scanner 48 is provided to a computer 50, which is simultaneously designed as a digital counter, by means of an amplifier 49; the computer evaluates the result and provides an accordingly simple or complex signal to an output terminal 51. This may be a signal which is shown in numbers on the digital indicator 34, or a validity indication is effected by means of a further switch unit on the green lamp 35 or a non-validity (refusal) indication is effected on the red lamp 36. The electronic construction of the device is as simple as the above-explained mechanical structure.

Figure 7:
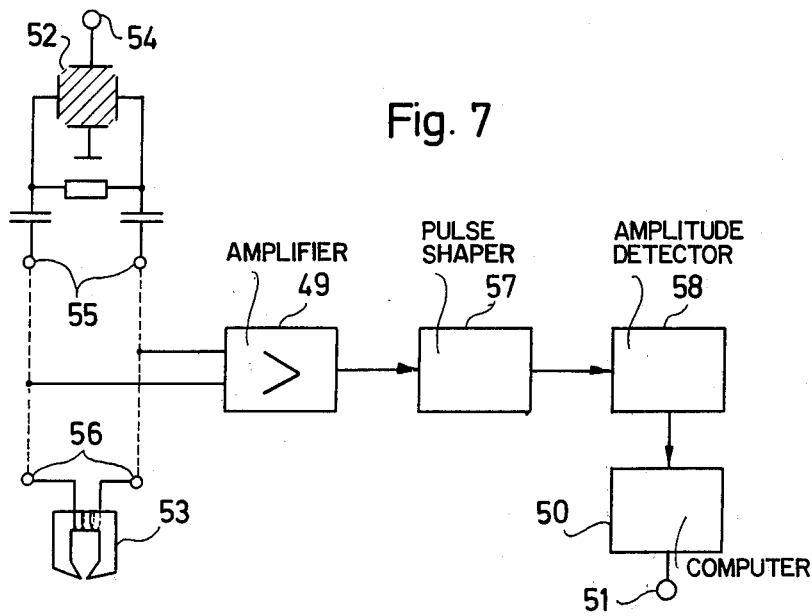
FIG. 7 illustrates in greater detail the switch of a device having a scanner which is selectively constructed either as a Hall-scanner or as a magnetic head.

FIG. 7 shows in a more detailed form an embodiment of the electrical part of the device. It is at first indicated that the scanner 48 can either be a Hall-scanner 52 or a head scanner 53, namely, as a commonly known magnetic head. In the Hall-scanner, a voltage of, for example, +5V, is placed on a terminal 54. The oppositely placed electrode is grounded. A signal is obtained from the other electrode pair of the Hall-scanner 52, which electrode pairs are positioned opposite each other, by means of terminals 55, which are connected with the inputs of the amplifier 49. The Hall-scanner 52 reacts already to extremely low field strengths. A magnetic head may be utilized instead as a head-scanner 53, which is connected with the inputs of the amplifier 49 by means of terminals 56.

The starting signal of the amplifier 49 is provided to a pulse shaper 57. This latter, for example, may be a Schmitt-switch. If an amplitude detector 58 is series-switched to the pulse shaper 57, the pulse shaper 57 cannot have an effect on the amplitudes. The amplitude detector 58 is designed so as to allow passage of pulses only whose amplitudes are between a lower and a higher limit value. All other pulses are not permitted to pass through and are thus also not transmitted to the computer 50 which again evaluates the results received from the scanners, and places a respective signal on the output terminal 51.

Figure 8:
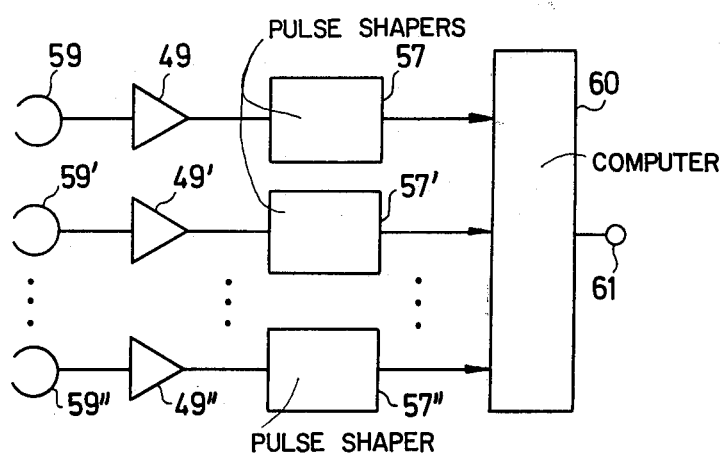
FIG. 8 is a schematic diagram of a device having a scanner comprising a plurality of single scanners.

FIG. 8 shows a multi-channel scanner comprising a plurality of single scanners 59, 59', 59'' which are in the form of magnetic heads. The starting signals of the single scanner 59, 59', 59'' are transmitted to amplifiers 49, 49', 49'' and pulse shapers 57, 57', 57'' and possibly under interpolation of an amplitude detector; they are placed on a complex computer 60 which evaluates the measuring results and transmits a corresponding signal to an output terminal 61. Such a design is advantageous if, for the purpose of increasing the safety factor against forgery, a plurality of single scanners or a multichannel scanner as shown by the dotted line in FIGS. 3, 4 and 5 is utilized.

Furthermore, additional data can be obtained with the respective design of the computer, for example, with regard to the directed or non-directed type of the position of the fibers, length of the fibers and other data.

What is claimed is:

1. An apparatus for checking the authenticity of documents such as paper money, credit cards, identification cards, and the like, said apparatus comprising in combination:

a document having fibers which are coated with spaced magnetic or magnetizable particles embedded therein;

detecting means for scanning said documents to determine the number of particles present in said documents; and means for moving said document and said detecting means relative to each other so as to provide a scanning trace, said document and said detecting means being disposed in a close relationship to each other, wherein said detecting means comprises a scanner having a rotational movement and said document is provided with a translational movement so as to obtain a circular scanning trace.

2. An apparatus as claimed in claim 1, wherein the linear speed of the rotational movement of said scanner is higher than that of the translational movement of said document.

3. An apparatus for checking the authenticity of documents such as paper money, credit cards, identification cards, and the like, said apparatus comprising in combination:
- a document having fibers which are coated with spaced magnetic or magnetizable particles embedded therein;
- detecting means for scanning said documents to determine the number of particles present in said documents; and
- means for moving said document and said detecting means relative to each other so as to provide a scanning trace, said document and said detecting means being disposed in a close relationship to each other, wherein said detecting means comprises a scanner which has an overlapping rotational movement and a translational movement which is continuously increasing away from its rotational center so as to provide a spiral-shaped scanning trace 4. An apparatus for checking the authenticity of documents such as paper money, credit cards, identification cards, and the like, said apparatus comprising in combination:
- a document having fibers which are coated with spaced magnetic or magnetizable particles embedded therein;
- detecting means for scanning said documents to determine the number of particles present in said documents; and
- means for moving said document and said detecting means relative to each other so as to provide a scanning trace, said document and said detecting means being disposed in a close relationship to each other, wherein said detecting means comprises a plurality of single scanners which rotate with varying radii, measuring areas of equal dimensions, are obtained by a computer which translates the count-summaries, which are scanned from the various measuring areas, to a norm-measuring area.

* * * * *